Patented Dec. 30, 1924.

1,521,282

UNITED STATES PATENT OFFICE.

STERLING H. DIGGS, OF WHITING, INDIANA, ASSIGNOR TO STANDARD OIL COMPANY, OF WHITING, INDIANA, A CORPORATION OF INDIANA.

ART OF REFINING OILS.

No Drawing.  Application filed January 31, 1921. Serial No. 441,444.

*To all whom it may concern:*

Be it known that I, STERLING H. DIGGS, a citizen of the United States, residing at Whiting, in the county of Lake and State of Indiana, have invented a new and useful Improvement in the Art of Refining Oils, of which the following is a specification.

The present invention relates to the art of refining hydrocarbon oils, and will be fully and clearly understood from the following description thereof, in which specific details of process embodying the invention are set forth.

In the refining of hydrocarbon oils, and particularly those oils intended for use as lubricants, by treatment with sulfuric acid, there is in general a greater or less quantity of acid left in the oil, which is not removed with the sludge and which does not readily settle out of the oil, even on prolonged standing. It is usually found that the greater part of this acid is present in the treated oil as minute, suspended particles of sludge, which are designated as "pepper." This is particularly the case when the treated oil is a reduced crude or steam refined stock, or when it is a heavy lubricating oil stock. The acid present in the treated oil, particularly when in the form of pepper, is difficult to remove, particularly after neutralization, by reason of the tendency to emulsification when washed with water. Emulsions thus formed with either acid or neutralized oil are very persistent and troublesome.

I have discovered that acid treated oil containing free acid, particularly when in the form of pepper, may be treated for the removal of the acid without formation of emulsions by adding thereto slaked lime in suspension. I thereby effect the neutralization and removal of the acid without formation of emulsions, and furthermore, in the subsequent washing of the oil with water, there is substantially no tendency to emulsification.

As an example of the use of my invention the treatment of a reduced crude or steam refined stock is hereinafter described.

A steam refined stock, for example, from mid-continental crude reduced by fire and steam to a 60 to 90% bottom, is treated with sulfuric acid, the proportion of which may be varied in accordance with the character of finished oil desired. For example, 40 lbs of 66° acid may be used per 100 gallons of oil. The greater part of the acid sludge settles out, and a large proportion of that remaining in the oil is in the form of suspended particles or "pepper". If desired the oil may be settled for 24 hours or longer. This is, however, not necessary, but may result in some sedimentation of sludge with a consequent reduction in consumption of reagent in the subsequent steps of the process.

The oil may then be heated to from 150 to 210° F., and if desired, may be agitated or blown with air while being heated. The agitation with air is optional; it has the advantage, however, of removing some $SO_2$ from the oil. I prefer to heat the oil to about 180° F. before proceeding with the next step of the process.

Slaked lime in suspension or cream of lime is then added to the oil, preferably in slight excess. During addition of the lime the oil is agitated, and for some time afterward, say, for a half hour altogether. With oil acid treated as described an aqueous suspension of lime containing about 300 lbs. of lime (as CaO) in 900 to 1000 gallons total liquid may suitably be added to 90000 gallons of oil. If desired additional water (preferably hot) may be added, the total amount of aqueous liquid varying from 1 to 5%. Moderate agitation may then be continued for a short period, say 10 minutes. If the amount of lime added is not sufficient, more alkali may then be added, either as a lime suspension or ammonia. In general none is required.

The oil is then allowed to settle, preferably while being heated to a temperature between 150 to 210° F. It may suitably be maintained at 180° F. for 6 to 10 hours. It is not necessary that the oil be heated; however, if not heated, a longer time is required for settling. The oil, after settling, is ready for further use and may for example, be charged into stills for production of lubricating oil.

The amount of acid used in treating the oil may, of course, vary within wide limits, say from 20 to 200 lbs. per 100 gallons, according to the use for which the oil is intended. The proportion of lime employed must be correspondingly varied. The lime appears to act not merely as an alkali in neutralizing the acid remaining in the oil, but also as a precipitant for the suspended sludge-acid or pepper, by reason of its state of fine dispersion.

I claim:

1. The process of refining residual hydrocarbon oil which comprises subjecting the oil to the action of sulfuric acid, settling out sludge, and treating the oil with an aqueous suspension of finely dispersed hydrated lime.

2. The process of refining residual hydrocarbon oils which comprises subjecting the oil to the action of sulfuric acid, settling out sludge, heating the oil to 180° F. and adding thereto an aqueous suspension of finely dispersed hydrated lime.

3. The process of refining residual hydrocarbon oil which comprises subjecting the oil to the action of sulfuric acid, settling out sludge, heating the oil to 180° F. and agitating with the oil from one to five per cent of an aqueous suspension containing finely dispersed hydrated lime.

4. The process of refining residual hydrocarbon oil which comprises subjecting the oil to the action of sulfuric acid, settling out sludge, heating the oil to 180° F. and agitating with the oil from one to five percent of an aqueous suspension containing finely dispersed hydrated lime, the quantity of hydrated lime being slightly in excess of that required to neutralize the oil.

5. The process of refining reduced crude oil which comprises subjecting the oil to the action of from 20 to 200 pounds of sulfuric acid per hundred gallons, settling out sludge, heating the oil to 180°, adding from 1 to 5% of aqueous suspension of finely dispersed hydrated lime, the quantity of the latter being sufficient to neutralize the oil, continuing moderate agitation for a period and removing the aqueous liquid.

6. The improvement in the removal of "pepper" from sulfuric acid treated residuum oil which comprises agitating the oil with an aqueous suspension of finely dispersed hydrated lime.

STERLING H. DIGGS.